March 24, 1925. 1,531,158
F. THORINGTON
AUTOMOBILE CLUTCH
Filed Dec. 10, 1923 2 Sheets-Sheet 1
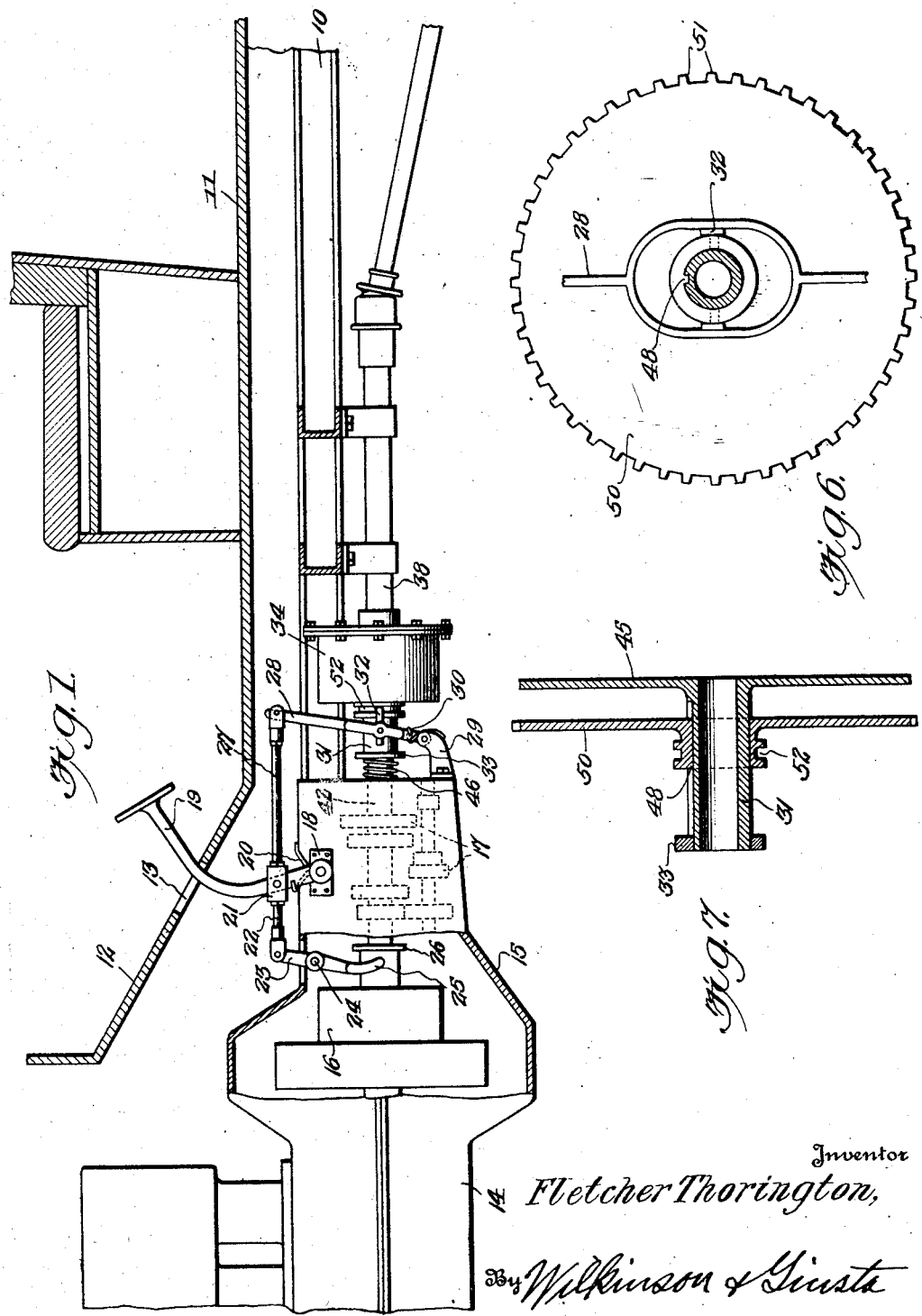
Inventor
Fletcher Thorington,
By Wilkinson & Giusta
Attorneys March 24, 1925.                                                                    1,531,158
F. THORINGTON
AUTOMOBILE CLUTCH
Filed Dec. 10, 1923                       2 Sheets-Sheet 2
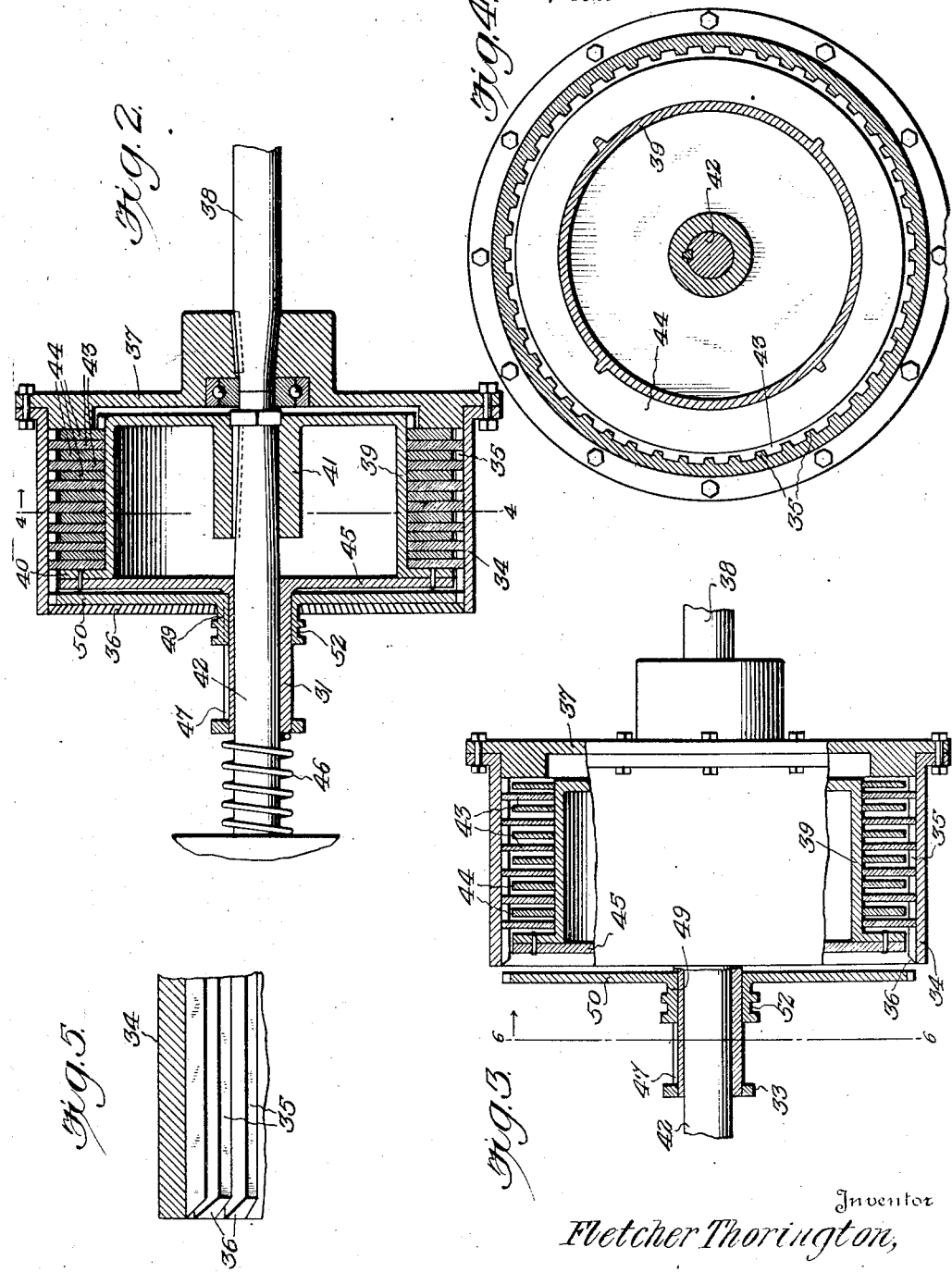
Inventor
Fletcher Thorington,
By Wilkinson & Fiuste
Attorneys Patented Mar. 24, 1925.

1,531,158

UNITED STATES PATENT OFFICE.

FLETCHER THORINGTON, OF BIRMINGHAM, ALABAMA.

AUTOMOBILE CLUTCH.

Application filed December 10, 1923. Serial No. 679,700.

*To all whom it may concern:*

Be it known that I, FLETCHER THORINGTON, a citizen of the United States, residing at Birmingham, in the county of Jefferson and State of Alabama, have invented certain new and useful Improvements in Automobile Clutches; and I do hereby declare the following to be a full, clear, and exact description of the invention, such as will enable others skilled in the art to which it appertains to make and use the same.

The present invention relates to power transmission devices, and more particularly to a novel arrangement of clutches and change speed devices in the drive line for use particularly upon motor vehicles.

An object of the present invention is to provide a clutch device at each end of a change speed transmission mechanism for entirely freeing both the drive and driven shafts thereof, for facilitating the shifting of gears irrespective of the movements of the engine or vehicle, and to enable the operator to shift the engine or motor from a higher to a lower speed relatively to the drive shaft, and vice versa, so that the motor may be used as a brake for checking the speed of the vehicle when descending a hill.

Another object of the invention is to provide a transmission mechanism including front and rear clutches, and an intermediate change speed transmission mechanism with devices for positively interlocking the sections of the rear clutch after the parts thereof have become relatively stationary to prevent the slipping of the parts of the rear clutch incident to the abnormal strains imposed upon it at the rear end of the change speed mechanism.

Among the various further objects of the invention may be mentioned the following:

(a) The mechanism may be shifted to low gear before the vehicle has stopped rolling backward or may be shifted to reverse gear before the vehicle has stopped rolling forward, so that the motor may be used for a brake to stop and change the direction of the vehicle instead of the use of one clutch and the foot brake to stop the vehicle, a disadvantage of the present method where the vehicle has to be stopped before the gears may be changed to low or reverse.

(b) The present mechanism may be shifted from the third or high speed to first or low speed when on a hard pull, such as with a loaded truck on a steep hill, without injury to the transmission gears or the clutches.

(c) The present devise may be shifted to the low gear, so that the motor may be used as a brake in case of accident, or necessity where a vehicle starts to roll backward while attempting to shift gears and the regular brakes fail to hold the vehicle from rolling backward, the same advantage being derived when the brakes fail to hold the vehicle from rolling forwardly.

(d) The present device permits the vehicle to be rocked back and forth from low speed to reverse when stuck in mud without undue strain or injury upon the change speed transmission gears and the clutches.

A still further object of this invention is to provide a drive line clutching mechanism embodying all of the above characteristics, and which at the same time is operable by a control from a single clutch pedal which may be positioned and operated in the same place and manner as are the clutch pedals on the motor vehicles of the present day type.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a side elevation partly in section of a clutching mechanism constructed according to the present invention, and as installed upon a motor vehicle between the motor and the drive shaft, parts of the vehicle being shown in section.

Figure 2 is a detail enlarged sectional view of the rear clutch with its associated parts shown in clutched and interlocked relation.

Figure 3 is a like view, partly in elevation, showing the clutch released.

Figure 4 is a transverse section through the clutch taken substantially on the line 4—4 of Figure 2.

Figure 5 is a fragmentary enlarged view in section of a portion of the open end of the drum, showing the bevelled internal teeth.

Figure 6 is a front elevation of the clutch locking disc, taken substantially on the line 6—6 of Figure 3, and Figure 7 is a detail transverse sectional view taken through the releasing and lock plates or discs of the clutch in assembled relation.

Referring to the drawings 10 designates the frame of a motor vehicle which may be provided with the body 11 of any suitable type having the usual toe board 12 through which the slot 13 is formed for receiving the clutch pedal in the usual manner. The vehicle is provided with a motor 14 shown conventionally of the usual internal combustion engine type, and which has a combined clutch and transmission casing 15 formed as a unit with the engine 14, and in which the forward clutch 16 is mounted and also the usual change speed transmission mechanism 17, the latter being arranged in rear of the clutch 16. The transmission portion of the casing 15 has at one side a bracket 18 to which is pivotally connected the lower end of a clutch pedal 19 which extends upwardly through the slot 13 in the toe board 12, and which is curved rearwardly in the usual manner for engagement with the foot. A spring 20 is arranged between the bracket 18 and the pedal 19 for normally urging the latter into its rearmost position of rest.

The pedal 19 carries a yoke 21 to the forward end of which is connected an adjustable rod 22 pivotally secured at its forward end to the upper extremity of a forward clutch arm 23 pivoted at 24 in the housing 15, and which has a fork 25 upon its lower end straddling the sleeve of the clutch 16, and arranged to engage the clutch collar 26 for shifting the clutch when the fork 25 is swung rearwardly. It will be noted that there is a considerable space between the fork 25 and the collar 26 for a purpose which will hereinafter appear, and so that the arm 23 may swing through a predetermined distance before the clutch 16 is released.

The yoke 21 carries a rearwardly extending rod 27 which is adjustable and which is pivotally connected at its rear end to the upper end of a rear clutch arm 28, which is pivoted at its lower end to a bracket 29 which is secured upon the lower rear portion of the casing 15. A spring 30 is arranged between the bracket arm 29 and the arm 28 for normally urging the latter into a rearmost position as shown in Figure 1. The intermediate portion of the rear arm 28 is given ring shape, so as to enclose the rear clutch sleeve 31, and carries intermediate said ring shaped portion a pair of links 32 which are arranged at opposite sides of the sleeve 31, and which project forwardly a short distance from the arm 28 to engage the outturned collar 33 to release the rear clutch, designated generally at 34 after the lever 28 has moved forwardly through a predetermined distance.

The rear clutch 34, like the front clutch 16, may be of any approved type which is normally closed and in the present instance for the purpose of illustration only, is shown as being of a multiple disc type. The body 34 or drum of the clutch is open at its forward end, and has internal teeth 35 extending substantially in parallelism with the axis of the clutch, and which are bevelled or tapered at their forward ends 36 to facilitate the entrance of a locking device hereinafter described. The rear end of the drum 34 carries a plate 37 adapted to be keyed to a driven shaft 38 which leads to the rear drive wheels of the vehicle. Within the drum 34 is placed a second reduced drum 39 provided with a flange 40 at its forward end which is out-turned, and which has a hub portion 41 at its inner end, the hub portion extending forwardly within the inner drum 39 and arranged to be slidably keyed upon the drive shaft 42 which leads from the transmission mechanism 17. The outer drum 34 has keyed to it a plurality of discs 43 which alternate with the plurality of intermediate discs 44 which are keyed upon the inner drum 39. The discs 43 and 44 are adapted to be crowded together for frictionally engaging the inner and outer drums of the clutch between the rear clutch plate 37 and the out-turned flange 40 of the inner drum. This binding together of the discs 43 and 44 is effected by a forward clutch plate 45 which is fitted in the forward end of the outer drum 34, and which carries the clutch sleeve 31 rotatable upon the shaft 42, and which is urged normally in a rearward direction by a spring 46 or the like. Of course any suitable means may be provided for normally urging the discs 43 and 44 together. The clutch sleeve 31 is made relatively long and is provided with a key-way 47 at one side for reception of a key 48 of the hub 49 of a locking disc or plate 50, which is slidably disposed upon the sleeve 31, and which has peripheral teeth 51 adapted to interlock with the teeth 35 of the outer drum 34. The outer drum 34 may thus be positively locked through the disc 50 and sleeve 31 with the plate 45, and the inner drum 39.

The hub 49 of the locking disc 50 has a peripheral groove 52 into which the inturned ends of the links 32 engage. When the arm 28 is swung forwardly it thus carries the hub 49 and disc 50 therewith to release the disc 50 from the outer drum 34.

In operation, when the clutch pedal 19 is first moving forwardly, the front clutch arm 23 is moving toward the collar 26 and during this idle movement of the arm 23 the rear clutch arm 28 draws the locking disc 50 out of the drum 34 and releases the rear clutch. The further forward movement of the rear clutch arm 28 brings the links 32 against the rear collar 33 and with-draws the plate 45 and the inner drum 39 and thus releases the clutch discs 43 and 44. Immediately pressure is released from the clutch discs 43 and 44, the arm 23 engages the forward collar 26, and the final movement of the clutch pedal 19 thus releases the forward clutch 16. More specifically, the rear clutch operates as follows:—The flange 40, drum 39, hub 41, disc 45, and its hub 31 are practically a unit which slides longitudinally on shaft 42 toward and from the back plate 37. Figure 2 shows the spring 46 urging the unit backwardly toward the plate 37 and crowding the clutch discs 43 and 44 together. This is possible because the lever 28 is in its backward position as shown in Figure 1. The unit moves backwardly in advance of the lever 28, and consequently the locking disc 50, is finally moved by the lever 28 into locking engagement with the drum 34. This action locks the drum 34 and back plate 37, keyed on shaft 38, to said unit and, as the latter is keyed to shaft 42 the two shafts 42 and 38 are locked together to take the strain from the clutch discs 43 and 44. Figure 3 shows the locking disc 50 disengaged from the drum 34 and the clutch discs released or separated. The change speed mechanism 17 may now be adjusted as both the drive and driven shafts thereof are free from the mechanism and are permitted to come to rest. The change speed mechanism may thus be adjusted into high or low gears, or in reverse gear as is required without noise and without danger of injuring the gear mechanism, because no strain is imposed on either shaft of the gear mechanism.

It is obvious that various changes and modifications may be made in the details of construction and design of the above specifically described embodiment of this invention without departing from the spirit thereof, such changes and modifications being restricted only by the scope of the following claims:—

What is claimed is:—

1. In a power transmission device, a pair of clutches, a change speed transmission mechanism interposed between the clutches, a control pedal pivotally mounted intermediate the clutches, a rod pivotally mounted intermediate its ends on said pedal, operating levers pivotally mounted adjacent to the clutches and connected to the rod, whereby said levers may be operated simultaneously by movement of the control pedal, one of said levers terminating in spaced apart relation with respect to its clutch, a clutch locking device associated with the other clutch and slidable relative thereto, and means connecting the locking device directly to said other lever, whereby the locking device is released from its clutch prior to the engagement between the first mentioned lever with its clutch when the control pedal is operated.

2. In a power transmission device, a pair of clutches, a speed change transmission mechanism interposed between the clutches, a clutch pedal mounted intermediate the clutches, operating levers associated with the clutches and connected to the clutch pedal, for simultaneous operation thereby, said clutches being provided with slidable sleeves connected to the movable elements of the clutches, and being positioned in spaced apart relation with respect to their respective operating levers, a sleeve slidable upon one of said clutch sleeves, and a clutch locking device carried by the slidable sleeve, said sleeve and locking device being connected directly to one of the operating levers whereby the locking device in released prior to any movement of the clutches when the clutch pedal is operated.

3. In a power transmission device, a pair of clutches, a change speed transmission mechanism interposed between the clutches, a common control pedal for the clutches, means including pivoted operating levers connecting the clutches and pedal, a locking device associated with one of the clutches, a link carried by one of the levers and having one end connected to the locking device and its opposite end terminating in spaced relation with respect to the movable member of the clutch, said other operating lever terminating in spaced relation with respect to the movable member of the other clutch, whereby, upon movement of the control pedal, the locking device, its associated clutch and the other clutch are operated in sequence.

FLETCHER THORINGTON.